(12) United States Patent
Sawada et al.

(10) Patent No.: US 6,694,808 B2
(45) Date of Patent: Feb. 24, 2004

(54) METHOD AND APPARATUS FOR REDUCING PRESSURE FLUCTUATIONS IN SUPERSONIC WIND TUNNEL CIRCUIT

(75) Inventors: Hideo Sawada, Chofu (JP); Tetsuya Kunimasu, Chofu (JP)

(73) Assignee: National Aerospace Laboratory of Japan, Tokyo (JP)

(*) Notice: Subject to any disclaimer, the term of this patent is extended or adjusted under 35 U.S.C. 154(b) by 0 days.

(21) Appl. No.: 10/225,131

(22) Filed: Aug. 22, 2002

(65) Prior Publication Data

US 2003/0056580 A1 Mar. 27, 2003

(30) Foreign Application Priority Data

Aug. 24, 2001 (JP) ......................................... 2001-255249

(51) Int. Cl.[7] .............................................. G01M 9/00
(52) U.S. Cl. ....................................................... 73/147
(58) Field of Search ................................. 73/1.57, 1.59, 73/1.66, 1.71, 147, 204.21; 244/35 R, 35 A, 36, 198, 204, 213–215, 45 R (56) References Cited

U.S. PATENT DOCUMENTS 4,189,939 A * 2/1980 West et al. .................... 73/116

OTHER PUBLICATIONS

S. P. Wilkinson, et al.; AIAA 17 Aerospace Ground Testing Conference—Jul. 6–8, 1992/Nashville, TN.

* cited by examiner

Primary Examiner—William Oen
(74) Attorney, Agent, or Firm—Westerman, Hattori, Daniels & Adrian, LLP (57) ABSTRACT

The operating efficiency of a compressor in the range of low Mach numbers at a supersonic wind tunnel test section (for which a considerable flow rate is required) is emphasized, and a design is provided in which pressure fluctuations can be reduced in a supersonic flow and also can be reduced in a supersonic wind tunnel circuit capable of operating at the required Mach number. Pressure fluctuations of flow brought about by inefficient operation can be reduced by operating an axial compressor 9 at a higher operating efficiency in the presence of a tunnel circuit resistor than the operating efficiency determined by the operating state theoretically calculated based on the Mach number required at a test section 19 in the absence of the tunnel circuit resistor. The Mach number at the test section can be made to conform to the required Mach number by causing the stream produced by the axial compressor 9 to pass through the tunnel circuit resistor such as a mesh plate 20 mounted in the tunnel circuit. The mesh plate 20 itself is effective for reducing pressure fluctuations and noise in the flow.

6 Claims, 6 Drawing Sheets

METHOD AND APPARATUS FOR REDUCING PRESSURE FLUCTUATIONS IN SUPERSONIC WIND TUNNEL CIRCUIT

BACKGROUND OF THE INVENTION

1. Field of the Invention

The present invention relates to method and apparatus for reducing pressure fluctuations in the supersonic wind tunnel that make it possible to reduce pressure fluctuations at the test section induced by the pressure fluctuations existing in the tunnel circuit, and to obtain wind tunnel test results in high accuracy.

2. Description of the Related Art

Figure 3:
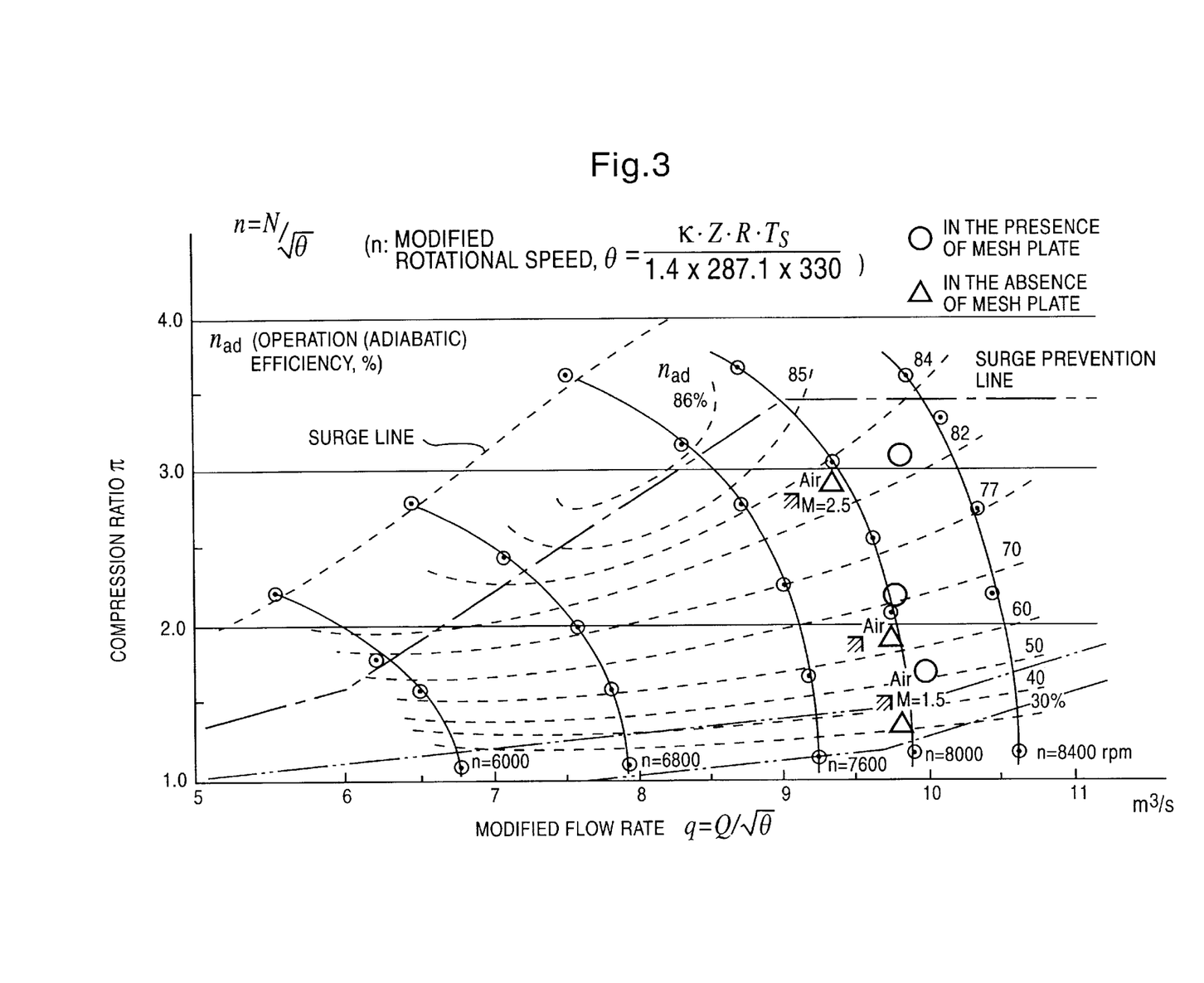
FIG. 3 is a diagram showing an example of the operating characteristics, including variations in operating efficiency, of a compressor in a supersonic wind tunnel circuit provided with a device for reducing pressure fluctuations in a tunnel circuit in accordance with the present invention.

In conventional practice, the operation range of a compressor of the continuous supersonic wind tunnel circuits are used to be determined at the design stage. A compressor is commonly designed to operate at high efficiency in the range of comparatively high Mach numbers at the tunnel test section, but the operating efficiency thereof at low Mach numbers is not necessarily high. FIG. 3 is a diagram in which modified flow rate q is plotted on the horizontal axis, compression ratio π is plotted on the vertical axis, and the operating characteristics of a compressor are shown as an example, with a modified rotational speed n and operating efficiency (adiabatic efficiency) $\eta_{ad}$ as parameters. The operating efficiency of a conventional supersonic wind tunnel is high (70% or greater) at Mach number of 2.5 but extremely low (about 40%) when the Mach number is 1.5, as shown by the symbol Δ. In FIG. 3, k is the specific heat ratio of gas (1.4 in the case of air), Z is the compressibility factor (1.0 in the same case), R is the gas constant (29.27 m/K), Ts is the static temperature (330K), and Q is the flow rate at compressor inlet (m³/s).

Stream in the tunnel circuit contains much both vortex energy and acoustic energy at low efficient compressor operation. The presence of such energy in the stream is observed together with the occurrence of pressure fluctuations as a pitot pressure fluctuation rate of 0.1% or greater in the stream at an operating Mach number of less than 2.2, particularly in a range of low Mach numbers such as 1.5–1.8. The energy in the stream can be measured as pressure fluctuations at the test section where the model is placed as the subject of the wind tunnel test. Since the pressure fluctuations existing at the test section disturb the laminar boundary layer on the model and cause turbulent transition, they may hinder improvement of measurement accuracy and affect the wind tunnel test results.

When the operating Mach number in a supersonic wind tunnel is in a range of low Mach numbers such as previously described, the occurrence of pressure fluctuations in the sections of the tunnel circuit extending from the compressor to the test section can be observed by sensors placed in the tunnel circuit. In particular, based on the measurement results of the pressure fluctuations in the settling chamber entrance, the nozzle entrance, and the center of the test section, the essential part of the pressure fluctuations in the center of the test section is believed to be directly induced by pressure fluctuations generated by a compressor operated at low efficiency. In the aforementioned operating Mach number range, most of the energy transferred from the compressor to the fluid is converted to thermal energy and vortex or acoustic energy (sound), and the energy from the compressor is not fully converted to the stream drive energy in the supersonic wind tunnel. Even if the stream from the compressor is cooled in a heat exchanger, the thermal energy alone is absorbed, while the vortex or acoustic energy remains in the stream.

In a supersonic wind tunnel designed as previously described, the test results obtained at a low Mach number do not necessarily conform with the results from the flight tests, so pressure fluctuations caused by the vortices or sound existing in the stream such as those that have an effect on the wind tunnel test results must be removed as much as possible from the upstream portion of the test section in order for the test results in the supersonic wind tunnel to be effective and reliable. In view of the above, a problem to be resolved herein is to provide a design in which pressure fluctuations in a supersonic stream can be reduced and the Mach number necessary for a test section can be obtained in the range of low Mach numbers (for which a considerable flow rate is required) by focusing on the operating efficiency of a compressor.

SUMMARY OF THE INVENTION

An object of the present invention is to provide a method and apparatus for reducing pressure fluctuations in the supersonic wind tunnel circuit in which the reliability of wind tunnel test results can be increased by minimizing the pressure fluctuations existing at the test section, and by reducing the pressure fluctuations that affect the measurement results.

Aimed at resolving the aforementioned problems, the present invention relates to a method for reducing pressure fluctuations in a supersonic wind tunnel circuit with the return leg, wherein the stream produced by the compressor is passed through a tunnel circuit resistor installed upstream of the test section, the compressor is operated at a higher operation efficiency than the operation efficiency determined by the operating state that corresponds to the flow condition for the Mach number required for the test section in the absence of the tunnel circuit resistor, and the Mach number at the test section is made to conform to the required Mach number by the additional pressure loss of the flow brought about by the presence of the tunnel circuit resistor.

The device for reducing pressure fluctuations in a supersonic wind tunnel circuit with the return leg in which stream produced by a compressor circulates in a tunnel circuit containing a test section comprises operation control means whereby the operation of the compressor can be controlled based on operating characteristics, with operating efficiency as a parameter; and an tunnel circuit resistor placed downstream of the compressor and upstream of the test section, wherein the operation control means performs control functions whereby the compressor is operated at a higher operation efficiency than the operation efficiency determined by the operating state that corresponds to the flow condition for the Mach number required for the test section in the absence of the tunnel circuit resistor, and the Mach number of the flow in the tunnel circuit is made to conform to the required Mach number by the additional pressure loss of the flow brought about by the presence of the tunnel circuit resistor.

In the supersonic wind tunnel, the inefficient component of the work performed by the compressor at a low operating Mach number is consumed as energy by the vortices or sound in the stream passing through the compressor. The compressor is operated at an operating point at which the operating efficiency thereof is markedly increased without changing the Mach number at the test section by having a design in which the stream produced by the compressor is passed through the tunnel circuit resistor, and the resistance factor thereof is set to an appropriate level. Since the compressor is highly efficient, the ratio of pressure fluctuations (sound and vortex energy) resulting from inefficient work to the total energy in the stream decreases, and the effect on the test section is reduced. In existing supersonic wind tunnels, the operating point in particular is selected such that the operating efficiency thereof is higher than the operating efficiency corresponding to the Mach number required for the test section (the required test section Mach number), the additional pressure loss necessary for the tunnel circuit is calculated based on the operating point and the desired compression ratio and flow rate (evaluated by the required test section Mach number), and the resistance factor of the tunnel circuit resistor for obtaining this pressure loss is determined. By the placement of such an tunnel circuit resistor downstream the compressor and upstream the test section, the Mach number of the stream at the test section can be made to conform to the required Mach number while the compressor can be operated at high operating efficiency, and the pressure fluctuations in the stream can be reduced.

According to the method and apparatus for reducing pressure fluctuations in the supersonic wind tunnel circuit of the present invention, conversion to vortex or acoustic energy due to the inefficient operating component of the compressor can be reduced and the pressure fluctuations existing in the stream in the tunnel circuit can be minimized at the same time as continuous operation can be maintained, by operating the compressor at an operating point at which the compressor exhibits higher operating efficiency than in the absence of an tunnel circuit resistor. The tunnel circuit resistor itself, consisting of a mesh plate, also has the effect of reducing pressure fluctuations and noise. As a result, pressure fluctuations affecting measurement results at the test section can be reduced, and the reliability of the wind tunnel test results increased. Since the range of high Mach numbers at which operation is possible cannot be reduced much by the characteristics of the supersonic wind tunnel or the characteristics of the tunnel circuit resistor even when the tunnel circuit resistor shaped as a mesh plate is installed in the tunnel circuit, improvements to wind tunnel tests at low Mach numbers can be devised without affecting the results of wind tunnel tests at high Mach numbers by only performing small changes, such as installing tunnel circuit resistors in existing supersonic wind tunnels.

DESCRIPTION OF THE PREFERRED EMBODIMENTS

The method and device for reducing pressure fluctuations in a supersonic wind tunnel circuit operate most efficiently when the required test section Mach number is within a low range from 1.5 to 2.2. Assuming that any invention like the present one is not taken concerning the pressure fluctuations, the pressure fluctuations are induced into the tunnel circuit most effectively when the compressor is operated with the Mach number at the test section not higher than 2.2, and particularly ranges from 1.5 to 1.8. According to this invention wherein a tunnel circuit resistor is installed in the supersonic wind tunnel circuit, the compressor can be operated at an operating point of high operating efficiency even with a low required Mach number.

With the method and device for reducing pressure fluctuations in a supersonic wind tunnel circuit, a mesh plate is preferably used for the tunnel circuit resistor. A mesh plate can be formed into a plate shape by the application of pressure to multiple layers of a wire netting, the resistance factor thereof can be adjusted by varying the mesh size or the number of laminated layers, and the plate can be provided with general characteristics whereby the pressure loss decreases with a reduction in the flow rate. The supersonic wind tunnel is characterized in that the flow rate decreases in the range of high Mach numbers at the test section. The resulting interrelation between the aforementioned general characteristics of the mesh plate and the characteristics of the supersonic wind tunnel allows the actual pressure drop occurring during passage through the mesh plate to be reduced in the range of high Mach numbers (for which high compression ratios are required), the range of Mach numbers in which the supersonic wind tunnel can be operated to be prevented from being markedly reduced due to installation of a mesh plate, and the supersonic wind tunnel to be operated across a wide range of Mach numbers even when the mesh plate is installed without being modified in any way. It is also evident that the mesh plate acts to absorb some of the acoustic energy.

Figure 1:
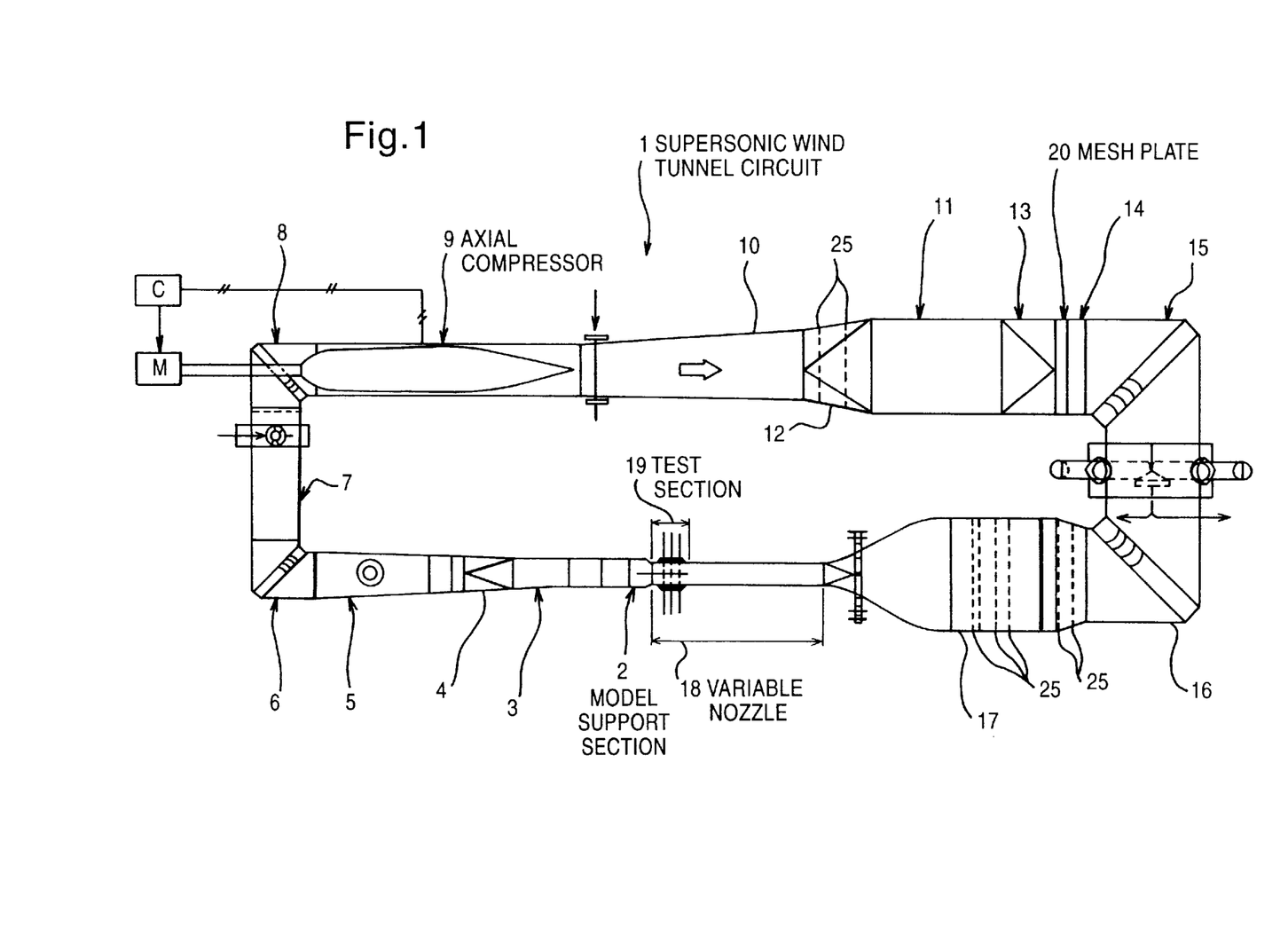
FIG. 1 is a planar schematic view showing an example of a supersonic wind tunnel circuit provided with a device for reducing pressure fluctuations in a tunnel circuit in accordance with the present invention.

Next, an embodiment of the present invention will be described in detail with reference to the accompanying illustrations. As shown in FIG. 1, the flow passing through a model support section 2 in a supersonic wind tunnel circuit 1 first passes through a second throat 3, a telescopic adaptor/diffuser 4, and a first diffuser 5; turns through a first corner 6; passes through a second diffuser 7 and a second corner 8; and reaches an axial compressor 9, or the main fan (which corresponds to the compressor in the present invention and is referred to herein below simply as "compressor"). After being supplied with dry gas or liquid nitrogen, the flow from the compressor 9 flows while diffusing into a third diffuser 10, and is then sent to a heat exchanger 11. A rapid diffuser 12 is attached to the heat exchanger 11 and a rapid contraction 13 follows it; the rapid diffuser 12 is fitted with two screens; and the contraction 13 is connected to a third corner 15. The third corner 15 is connected on the downstream side thereof to a fourth corner 16 via a bypass exhaust. A settling chamber 17 fitted with screens is connected to the downstream side of the fourth corner 16, and a variable nozzle section and a test section 19 containing a model supported by a string in the model support section 2 is disposed on the downstream side of the settling chamber 17. Mach number at the test section is adjusted by the 18 pairs of motor-driven actuators in the variable nozzle. The compressor 9 is actuated by a motor M with a drive shaft. The operation controller C of the compressor 9 controls the motor M on the basis of a characteristic curves shown in FIG. 3 with the operating efficiency $\eta_{ad}$ as parameters and the operating condition of the compressor 9. The wind tunnel circuit 1 is a supersonic wind tunnel circuit in which fluid circulates in a closed tunnel circuit through the model support section 2 and the variable nozzle 18.

Figure 2:
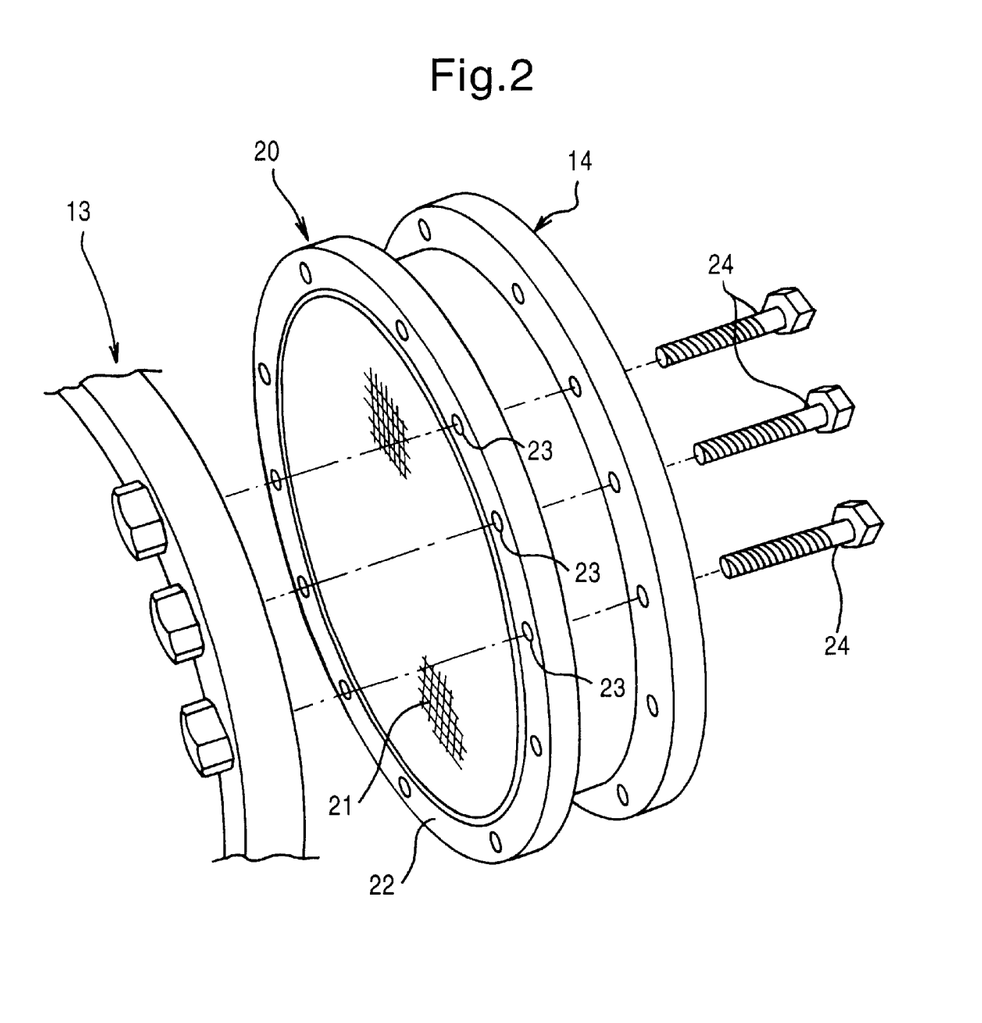
FIG. 2 is a perspective view showing an outline of a mesh plate in mounted state.

To reduce pressure fluctuations in the tunnel circuit, a mesh plate 20 is installed as an tunnel circuit resistor composed of a stacked wire mesh between the contraction 13 of the heat exchanger 11 of the supersonic wind tunnel circuit 1 and a cylindrical connector 14 disposed in front of the third corner 15 located downstream there from, as shown in FIGS. 1 and 2. The mesh plate 20 comprises a stacked wire mesh 21 designed to adjust the resistance factor, and has flanges 22 in which screw holes 23 (only some of them are indicated by symbols) for accommodating locking screws 24 are formed at regular intervals along the external periphery. The mesh plate 20 is tightened with the locking screws 24 (only some of them are shown) while secured on both sides by the corresponding flanges between the contraction 13 and the cylindrical connector 14. A sealing member such as an O-ring should preferably be interposed during such tightening.

The mesh plate 20 presents a resistance to the stream passing through the tunnel circuit because the plate is interposed across the entire cross section of the tunnel circuit. For this reason, higher compression ratio of the compressor 9 needs, and the driving force needed to operate the compressor 9 exceeds the prior level, but the operation can still be conducted at an operating point characterized by high operating efficiency. The additional pressure loss introduced by the mesh plate 20 can be evaluated by obtained data sets during a trial run aimed at performance evaluation (for example, by evaluating the tunnel circuit resistance needed to bring the Mach number at the test section 19 to 1.5 from 2.0, which is the Mach number for the operating point of the compressor 9). Determining the necessary pressure loss allows the resistance factor required for the mesh plate 20 to be determined by taking into account the dynamic pressure and cross-sectional area of the tunnel circuit.

For example, the resistance factor is about 1300 if the necessary pressure loss (drop) is 28 kPa, the tunnel circuit is a circular pipe with a diameter of 1 m, and the dynamic pressure is about 22 Pa. Installing a mesh plate 20 of such resistance factor downstream the compressor 9 and upstream the test section 19 in the tunnel circuit makes it possible to achieve the same condition with respect to the operation of the compressor 9 as when the operation is carried out at the Mach number of 2.0 in the absence of the mesh plate 20. At the same time, the flow between the inlet to the settling chamber 17 and the inlet to the compressor 9 can achieve the desired tunnel circuit pressure recovery ratio as a result of the fact that the variable nozzle 18 is contoured to a Mach number of 1.5. It is apparent that since flow resistance is increased by the presence of the mesh plate 20, and the required power is about 20% greater than in the absence of the mesh plate 20, excess compressor drive capability must be provided in proportion to the power increase.

The operating efficiency $\eta_{ad}$ of the compressor 9 remains substantially unchanged at about 82% in the presence of the mesh plate 20 in the tunnel circuit when the Mach number is 2.5, which corresponds to a high compression ratio required for the Mach number at the test section 19 (as shown in FIG. 3). At the Mach number of 1.5, which corresponds to a low compression ratio, the operating efficiency $\eta_{ad}$ is about 33% for a tunnel circuit without the mesh plate 20, whereas introducing the mesh plate 20 makes it possible to cause the compressor 9 to operate in a state in which the operating efficiency $\eta_{ad}$ is raised to about 53%. In addition, the operating efficiency $\eta_{ad}$ is about 63% for a tunnel circuit without the mesh plate 20 when the Mach number is 2.0, whereas introducing the mesh plate 20 makes it possible to cause the compressor 9 to operate in a state in which the operating efficiency $\eta_{ad}$ is raised to about 72%. Screens 25 may be placed at several specific positions in the supersonic wind tunnel, as shown in FIG. 1. The screens 25 act to finely divide the vortices arriving from the upstream side, to reduce the vortex scale, to rapidly weaken the vortices, and to accelerate the viscosity-based energy dissipation. Since the screens 25 can themselves serve as vortex-dissipating sources, they should have fine wires (wire diameter: 0.112 mm or 0.27 mm), the wire density (mesh count, or the number of wires per inch) thereof should be set to a coarse level (50 mesh or 20 mesh), and the open area ratio thereof should be 0.6 or greater. The mesh plate 20 has a resistance factor that is greater than that of the screens 25 by a factor of 100 or greater, possesses a very low open area ratio, and acts to consistently add the pressure loss designed to alter the operating point of the compressor 9.

Figure 4:
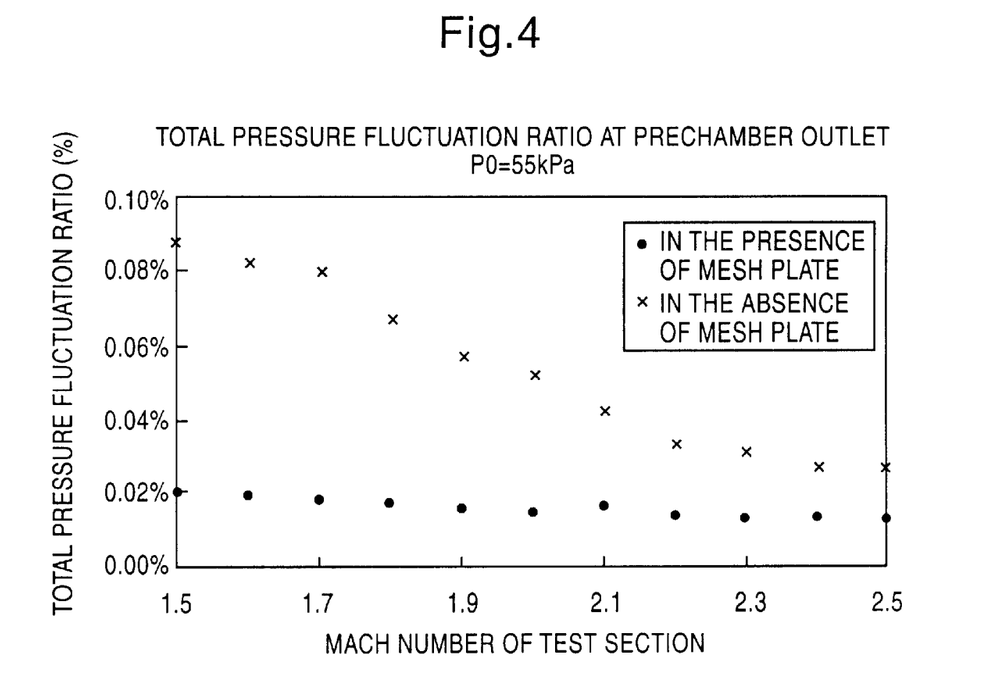
FIG. 4 is a graph showing the total pressure fluctuation ratio observed at the settling chamber exit in a supersonic wind tunnel circuit provided with a device for reducing pressure fluctuations in a tunnel circuit in accordance with the present invention.

FIG. 4 shows fluctuations in the total pressure fluctuation ratio at the settling chamber outlet with respect to the Mach number M. It can be seen in FIG. 4 that the pressure fluctuations increase with reduced Mach number M when the Mach number M ranges between 1.5 and 2.2 in the absence of the mesh plate 20, and that the pressure fluctuations remain substantially constant when the Mach number M ranges between 2.3 and 2.5. Specifically, the pressure fluctuations in the settling chamber 17 increases when the Mach number is in a range in which the compressor 9 operates within a range of low operating efficiencies, and the pressure fluctuations increase in accordance with the operating efficiency as the latter decreases. In the presence of the mesh plate 20, however, the pressure fluctuations remain substantially constant and have no dependence on the Mach number M, and the pressure fluctuations hardly change irrespective of an increase or decrease in the operating efficiency of the compressor 9. It can be concluded based on this fact that the pressure-related or acoustic fluctuations and vortices produced by the compressor 9 are reduced by the presence of the mesh plate 20. It can thus be seen that the pressure fluctuations at the outlet from the settling chamber 17 can be reduced by causing the compressor 9 to operate at higher operating efficiency in the presence of a mesh plate 20 when the Mach number M ranges from 1.5 to 2.2.

Figure 5:
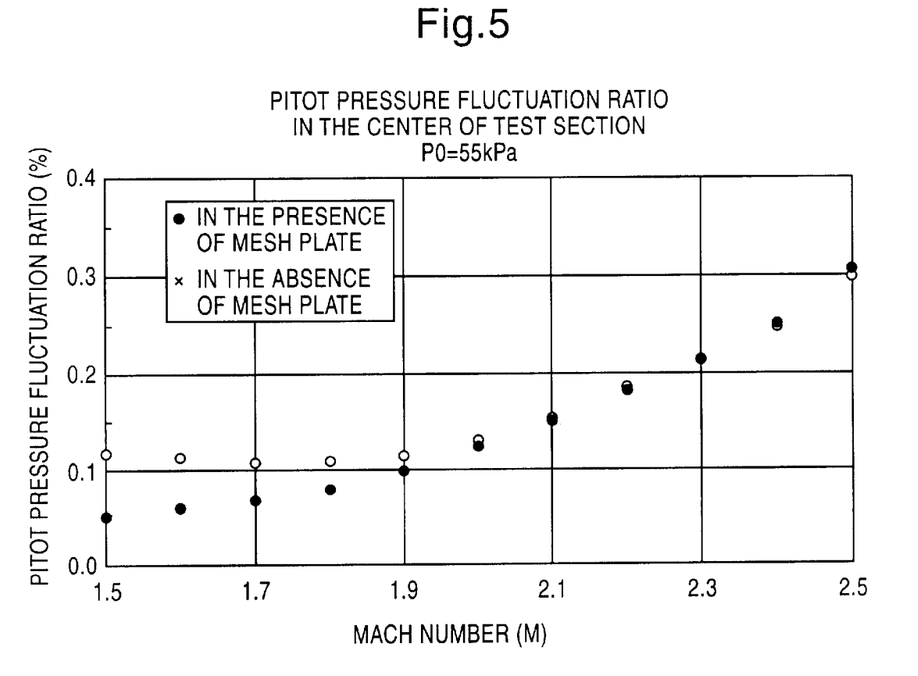
FIG. 5 is a graph showing the pitot pressure fluctuation ratio at the center of a test section in a supersonic wind tunnel circuit provided with a device for reducing pressure fluctuations in a tunnel circuit in accordance with the present invention.

As a result of a comparative study into the ratios in which the pressure at the test section 19 fluctuates in the presence or absence of the mesh plate 20, it was concluded that the ratio which the pressure fluctuates at the test section 19, which is an important element of a supersonic wind tunnel circuit, can be markedly reduced. FIG. 5 depicts the manner in which the pitot pressure fluctuation ratio varied with the Mach number at a total wind tunnel pressure of 55 kPa when a pressure transducer was mounted on the tip of a pitot tube at the center of the test section 19, and pitot pressure fluctuations were measured. In comparison with tests in which the mesh plate 20 was absent and in the presence of the mesh plate 20 while the compressor 9 operates at an operating point with higher operating efficiency, the ratio at which the pitot pressure fluctuates is clearly reduced, particularly in the range of low Mach numbers. This fluctuation level can meet the condition necessary for a quiet supersonic wind tunnel, that is, the condition that the pressure fluctuation ratio be less than 0.1%.

Figure 6:
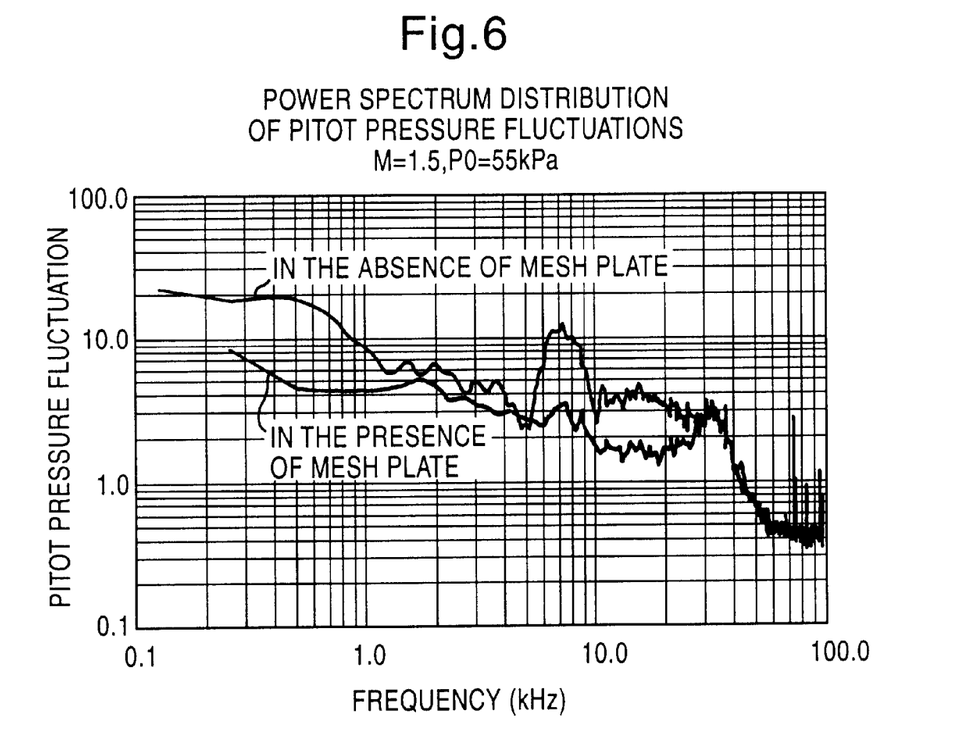
FIG. 6 is a power spectrum diagram of the pitot pressure fluctuation ratio observed in a supersonic wind tunnel circuit provided with a device for reducing pressure fluctuations in a tunnel circuit in accordance with the present invention.

FIG. 6 is a power spectrum diagram of a pitot pressure fluctuations measured by a pressure transducer mounted at the center of the test section 19. Whereas no significant change can be noted at a Mach number of 2.5, the pitot pressure fluctuations can be seen undergoing a marked reduction in the frequency range of 6 kHz to 30 kHz and at a low frequency of 4 kHz or less when the Mach number is at a low level (about 1.5). This proves that the mesh plate 20 is effective for reducing pressure fluctuations.

Sensing the noise level immediately downstream from the mesh plate 20 with the aid of a microphone produces a much lower level than the one observed in the absence of the mesh plate 20, indicating that the mesh plate 20 as such acts to reduce the noise level. Specifically, measuring the sound pressure level with the aid of a microphone downstream from the mesh plate 20 proved that the operating range of the compressor 9 had shifted to one with a higher Mach number (about by 0.3–0.4). At the same time, it was proven that the sound noise level decreased dramatically in comparison with the initial value thereof.

What is claimed is:

1. A method for reducing pressure fluctuations in a supersonic wind tunnel circuit in which stream produced by a compressor circulates in a tunnel circuit containing a test section, Wherein the stream produced by the compressor is passed through an tunnel circuit resistor disposed upstream of the test section;

the compressor is operated at a higher operation efficiency than the operation efficiency determined by the operating state that corresponds to the flow condition for the Mach number required for the test section in the absence of the tunnel circuit resistor; and the Mach number is made to conform to the required Mach number by the additional pressure loss of the flow brought about by the presence of the tunnel circuit resistor.

2. The method for reducing pressure fluctuations in a supersonic wind tunnel circuit according to claim 1, wherein the required Mach number falls within a range of 1.5 to 2.2.

3. The method for reducing pressure fluctuations in a supersonic wind tunnel circuit according to claim 1, wherein the tunnel circuit resistor is a mesh plate.

4. A device for reducing pressure fluctuations in a supersonic wind tunnel circuit in which stream produced by a compressor circulates in an tunnel circuit containing a test section, comprising:

operation control means whereby the operation of the compressor can be controlled based on operating characteristics, with operating efficiency as a parameter; and a tunnel circuit resistor placed downstream of the compressor and upstream of the test section, wherein the operation control means operates such that the compressor is operated at a higher operation efficiency than the operation efficiency determined by the operating state that corresponds to the flow condition for the Mach number required for the test section in the absence of the tunnel circuit resistor, and the Mach number at the test section is made to conform to the required Mach number by the additional pressure loss of the flow brought about by the presence of the tunnel circuit resistor.

5. The device for reducing pressure fluctuations in a supersonic wind tunnel circuit according to claim 4, wherein the required Mach number falls within a range of 1.5 to 2.2.

6. The device for reducing pressure fluctuations in a supersonic wind tunnel circuit according to claim 4, wherein the tunnel circuit resistor is a mesh plate.

* * * * *